United States Patent [19]

Korpman

[11] Patent Number: 4,813,947
[45] Date of Patent: Mar. 21, 1989

[54] CLOSURE SYSTEM FOR RESEALABLY ATTACHING A TAPE TAB TO A FABRIC SURFACE

[75] Inventor: Ralf Korpman, Bridgewater, N.J.

[73] Assignee: Personal Products Company, Milltown, N.J.

[21] Appl. No.: 1,116

[22] Filed: Jan. 7, 1987

Related U.S. Application Data

[63] Continuation of Ser. No. 814,452, Dec. 30, 1985, abandoned.

[51] Int. Cl.⁴ .............................................. A61F 13/16
[52] U.S. Cl. ................................... 604/387; 604/390; 525/98
[58] Field of Search ............... 525/95, 98; 604/387, 604/389, 390

[56] References Cited

U.S. PATENT DOCUMENTS

| | | | |
|---|---|---|---|
| 3,635,861 | 1/1972 | Russell | 525/98 |
| 3,850,858 | 11/1974 | Park | 525/98 |
| 3,862,068 | 1/1975 | Russell | 525/98 |
| 3,954,692 | 5/1976 | Davney | 525/95 |
| 3,993,613 | 11/1976 | Doss et al. | 525/98 |
| 4,136,699 | 1/1979 | Collins et al. | 604/387 |
| 4,141,876 | 2/1979 | Hansen | 525/98 |
| 4,163,077 | 7/1979 | Antonsen et al. | 604/390 |
| 4,181,635 | 1/1980 | Takamatsu et al. | 525/95 |
| 4,314,926 | 2/1982 | Allison | 525/95 |
| 4,371,576 | 2/1983 | Machell | 428/92 |
| 4,419,494 | 12/1983 | Puletti et al. | 525/95 |
| 4,460,364 | 7/1984 | Chen et al. | 604/387 |
| 4,540,415 | 9/1985 | Korpman | 604/390 |

FOREIGN PATENT DOCUMENTS

| | | | |
|---|---|---|---|
| 0053165 | 5/1981 | Japan | 525/98 |
| 0186577 | 9/1985 | Japan | 525/95 |
| 0223879 | 11/1985 | Japan | 525/98 |

OTHER PUBLICATIONS

U.S. Defense Pub. T917008 4, Dec. 1973.

*Primary Examiner*—C. Fred Rosenbaum
*Assistant Examiner*—Mark F. Colosimo
*Attorney, Agent, or Firm*—Lawrence D. Schuler

[57] ABSTRACT

A closure system is disclosed for resealably attaching a pressure sensitive adhesive coated tape tab to a hot-melt coated landing area of a fabric surface, whereby said closure system may be reopened and resealed numerous times while still permitting said tab to bond and hold tenaciously to the fabric surface.

10 Claims, No Drawings

CLOSURE SYSTEM FOR RESEALABLY ATTACHING A TAPE TAB TO A FABRIC SURFACE

This application is a continuation of Ser. No. 814,452, Dec. 30, 1985, now abandoned.

BACKGROUND OF THE INVENTION

This invention relates to a closure system for resealably attaching a tape tab fastener to a fabric surface. More particularly, this invention relates to the provision of such a system to a disposable diaper or incontinent device having a fabric covered backing.

Disposable diapers provide substantial advantages in convenience over diapers intended to be laundered and reused. Typical disposable diaper structures comprise a moisture-retaining layer of high liquid-holding capacity and a moisture impervious backing sheet therefor generally made of a plastic film such as polyethylene film or the like. Typical disposable diaper structures are shown in U.S. Pat. No. 3,612,055 and U.S. Pat. No. Re. 26,151.

As may be seen from the above cited patents, it is desirable to obviate the problems that are inherent in closure systems which utilize extraneous fasteners such as safety pins, snaps and zippers. U.S. Pat. No. 4,540,415 discloses a disposable diaper which has a pressure sensitive adhesive closure, a moisture-permeable facing sheet and a polyethylene moisture-impermeable backing sheet. The pressure-sensitive adhesive closure permits reopening the diaper numerous times without substantial damage to the polyethylene backing sheet or to the adhesive closure. However, it has recently been proposed to provide diapers and incontinent devices which have fabric covered backings and the closure of U.S. Pat. No. 4,540,415 is not suitable in connection with fabric covered diapers or incontinent devices when it is desired to reopen and reseal the closure system numerous times while still permitting the tape tab fastener to bond and hold tenaciously to the fabric surface.

It has been a challenge for pressure sensitive adhesive scientists to design an aggressive adhesive for making a strong bond to fabric surfaces. The difficulties with bonding to fabric are associated with the irregular surface to which the adhesive has to bond and still hold tenaciously. Furthermore, the problem becomes much more complex if there is a requirement for the closure system to be repositionable or resealable. The first important criterion is that the fabric should not have loose fibers which are picked up by the adhesive surface, thus making the adhesive non-functional. The loose fibers may be tied down by applying a hot melt coating on the fabric surface or by saturating the fabric with a hot melt composition. In accordance with the invention, it has been discovered that several important parameters must be met in order to prepare a successful coating from said hot melt composition. There criteria are as follows:

1. The coating must be non-tacky.
2. It must have good heat, light and aging stability.
3. It must be odor free.
4. It must possess low viscosity for good penetration and saturation into the fabric. The hot melt coating utilized in accordance with the present invention should have a viscosity of not more than 15,000 cps at 350° F. In this connection, it is desirable that the viscosity be less than 3,000 cps.
5. The pressure sensitive adhesives which are used according to the present invention and which are defined hereinafter, must have high shear values with respect to said coating. The 180° shear of the pressure sensitive adhesive, with respect to the coating, should be at least 15 lbs/inch although 25 lbs/inch is desirable.
6. The 90° peel of the pressure sensitive adhesive defined hereinafter, with respect to said coating should be at least 0.7 lbs/inch, although the preferred range is between 0.8 and 1.2 lbs/inch.
7. The ingredients in the hot melt coating must be non-contaminating with respect to the pressure sensitive adhesive so that repeated reseals can be achieved. In this connection a light ball tack measurement value should not change in excess of 15% when read after the first and after the fifth reseal.

Although there are numerous low viscosity (less than 15,000 cps at 350° F.) hot melt polymers or formulations available in the marketplace, none of them have been found suitable, per se, for the purpose of the present invention. Plasticizers or modifiers are frequently added to commercial formulations. These additions tend to migrate and become contaminants to the adhesive. Most of the known hot melt polymers are based on polyethylene, ethylene vinyl acetate, polyesters, polyamides and chemically modified polyethylenes or composites therewith. The known hot melt polymers were evaluated together with commercially compounded formulations but none of these polymers met all of the above listed criteria. The greatest failure among the known hot melt polymer formulations occured with respect to the 90° peel and 180° shear. In addition, there was rapid detackification of the pressure sensitive adhesive when comparing the first and the fifth reseal.

It has been discovered, in accordance with the present invention that the 90° peel and 180° shear and the resistance to detackification has been greatly improved and this improvement has made possible a repositionable closure for fabrics. In this connection, it has been found that particularly with respect to infant diapers in the toddler stage, it is desirable to be able to open the diaper to inspect it to see if the diaper needs changing. When the closure system of the present invention is utilized in connection with a diapers, in which the backing sheet is covered with a fabric, the closure is easily removed for inspection, and then just as easily readhered to the hot melt coated area of the fabric which may be woven or non-woven.

SUMMARY OF THE INVENTION

In accordance with the present invention there is provided a closure system for resealably attaching at least a portion of a pressure sensitive adhesive coated tape tab to a hot-melt coated landing area of a fabric surface. The pressure sensitive adhesive which is utilized comprises (a) an elastomeric and thermoplastic block polymer of the structure A-B-A, wherein A is a thermoplastic polymer block of vinyl arene and possesses a glass transition temperature of above normal room temperature and B is an elastomeric polymer block of isoprene, the thermoplastic A blocks composing about 10% to 30% by weight of the block polymer and (b) about 75 to 150 parts by weight of a tackifier or mixture of tackifiers per 100 parts by weight of the total elastomers, the melting point range of said tackifier or mixture of tackifiers being from 85° C. to 130° C. The hot melt coated landing area is formed from a hot melt coating composition comprising
(A) a hot melt polymer;

(B) between 10 and 50 parts by weight per 100 parts by weight of said hot melt polymer of a modifying resin having a number average molecular weight of between 500 and 3,000, the viscosity of the mixture of said hot melt polymer together with said modifying resin, being between 1,000 and 15,000 cps at 350° F.;

(C) between 0 and 40 parts by weight per 100 parts by weight of said hot melt polymer of a thermoplastic rubber of the A-B-A or A-B block copolymer family, with the proviso that when the amount of said thermoplastic rubber is greater than 0, then the amount of modifying resin may constitute up to 100 parts by weight per 100 parts by weight of said hot melt polymer. The 180° shear of the pressure sensitive adhesive, with respect to the landing area, is at least 15 lbs/inch, 25 lbs/inch being preferred. The 90° peel of the pressure sensitive adhesive with respect to the landing area is at least 0.7 lbs/inch, a range of 0.8 to 1.2 lbs/inch being preferred. The light ball tack measurement value of the pressure sensitive adhesive does not change more than 15% when read after the 1st and 5th reseal of the closure system. In view thereof, the closure system may be reopened and resealed numerous times while still permitting the tab to bond and hold tenaciously to the landing area of the fabric surface.

The present invention also includes a disposable diaper and an incontinent device, both of which are provided with a fabric covered backing, and each having the closure system described above.

DETAILED DESCRIPTION OF INVENTION

The conventional adhesive tape tab fastener used on a disposable diaper, whether that diaper be appropriate for an adult or an infant, generally consists of a substrate which is coated on one side with adhesive. One end of the substrate or tape segment is coated with an adhesive which appropriately affixes the tape tab permanently to the outside surface of the diaper. Thus, this end is identified as the fixed end. The other end of the adhesive tape segment is a free end. It is this free end which secures the diaper about the wearer when it is adhered to the outside diaper surface in an appropriate position, the hot melt coating composition being applied at said position.

Adhesive tabs suitable for the purposes of the present invention can be made from a wide variety of materials provided that such materials are sufficiently flexible. For example, substrates such as cloth, saturated paper, film, foil and the like may be used as substrates for coating with adhesive. For purposes of economy, the same adhesive used in accordance with the present invention should be utilized to affix the fixed end of the tape tab fastener to the surface of the diaper. With respect to the free end or working end of the tape tab, the adhesive utilized in accordance with the present invention is used, so that once the diaper has been secured about the wearer, the tape tab may easily be reopened either for inspection or repositioning the diaper in a more comfortable position.

The pressure sensitive adhesive applied as a coating on the free end of the tape is an adhesive formulated with a major proportion by weight of the total elastomers of a specific type of block copolymer in combination with a tackifier. The block polymer is both elastomeric and thermoplastic and has the structure A-B-A wherein A is a thermoplastic polymer block of a vinyl arene and possesses a glass transition temperature above normal temperature and B is an elastomeric polymer block of isoprene or copolymer therewith and the block polymer consist of about 10% to 30% by weight of A blocks based on the weight of the block polymer.

Preferably the A blocks have molecular weights of at least about 7,000. The block polymer structure A-B-A may be in a linear form, or a radial form. The individual A blocks have a number average molecular weight of at least about 6,000, preferably in the range of about 8,000 to 30,000. The number average molecular weight of the B blocks for linear A-B-A block copolymers preferably is in the range of about 45,000 to 180,000 and that of the linear copolymer itself preferably is in the range of about 75,000 to 200,000. The number average molecular weight of the radial A-B-A block copolymers preferably is in the range of about 125,000 to 400,000.

When the term total elastomers is used herein it shall mean the aggregate block polymers. The tackifier used in combination with the elastomeric and thermoplastic block polymer is a resin or resin mixture, the melting point range of which is between 85° C. and 130° C. The tackifier is selected from rosin or rosin derivatives, polyterpene resins or hydrocarbon resins. The amount of tackifier used is from about 75 to 150 parts, preferably from about 90 to 120 parts per hundred parts of the total elastomers.

In accordance with the invention, there is used a thermoplastic rubber-based adhesive composed of styrene-isoprene-styrene which is compounded at high loading with a suitable tackifying resin. This adhesive has a very good balance of adhesion/hold and tack properties. A typical formulation is as follows:

|  | Parts by weight |
| --- | --- |
| Kraton 1117 | 100 |
| Wingtack Plus | 120 |
| Butyl Zimate | 2 |
| Santovar A | 1 |

In the above connection, Kraton 1117 is a thermoplastic elastomeric A-B-A block copolymer offered by Shell Chemical Company and consisting of styrene-isoprene-styrene polymer.

Wingtack Plus is a solid tackifier resin consisting predominantly of polymerized piperylene and isoprene, a product of Goodyear Tire & Rubber Company.

Butyl Zimate is zinc dibutyl dithiocarbamate.

Santovar A is 2, 5 ditertiary amyl hydroquinone.

This invention also contemplates that conventional additives may be used in the adhesive formulation for various purposes. For instance, antioxidants such as tertiary butyl cresol may be used, as may conventional heat stabilizers such as the zinc salts of alkyl dithiocarbamates. Ultra-violet absorbers also may be added to the adhesive when improved outdoor weathering is required. Conventional inorganic fillers, pigments and coloring agents such as zinc oxide, aluminum hydrate, carbon black, clay, calcium carbonate, titanium dioxide and others may be used to extend the adhesive and alter its appearance or physical properties.

Methods of preparing the pressure sensitive adhesive compositions used in accordance with the present invention are disclosed in U.S. Pat. No. 3,932,328, which is incorporated herein by reference.

The hot melt coating composition of the present invention consists of a hot melt polymer mixed with between 10 and 50 parts by weight per 100 parts by weight of the hot melt polymer of a modifying resin having a number average molecular weight of between 500 and 3,000, the viscosity of the mixture of the hot melt polymer together with the modifying resin being between 1,000 and 15,000 cps at 350° F. The preferred range of modifying resin is between 20 and 30 parts by weight per 100 parts by weight of the hot melt polymer. It should be noted that the modifying resin itself, further lowers the viscosity of the system, so that the viscosity of the hot melt polymer may, in itself, be greater than 15,000 cps at 350° F., provided that sufficient modifying resin is added so to bring the viscosity of the resulting mixture to not more than 15,000 cps at 350° F.

There are two major types of modifying resins which may be used. The first type is that normally known as tackifying resins which includes hydrocarbon resins, rosin or rosin derivatives and polyterpene resins. The second type is commonly known as reinforcing resins such as solid coumarone indene resin, polyalphamethyl styrenes and polyalphamethyl styrene-vinyl toluene copolymers.

In the following Table I there are set forth four different hot melt coating compositions in accordance with the present invention. The first column of Table I is an example of the use of a hot melt polymer according to the prior art, there being no modifying resin incorporated therein. In this connection, it will be noted that the 90° peel is low and that the percentage loss in tack from the first to fifth reseal with respect to said prior art hot melt polymer is 20% and thus quite unsuitable for the purpose of the present invention.

The pressure sensitive adhesive used in connection with the tests set forth in Table I was the typical formulation set forth hereinabove.

TABLE I

|  |  |  |  |  |  | RANGE REQUIREMENTS |
|---|---|---|---|---|---|---|
| Epolene C18 | 100 | 100 | 100 | 100 | 100 |  |
| Escorez 5320 | 0 | 10 | 20 | 30 | 40 |  |
| Tinuvin 328 | 1 | 1 | 1 | 1 | 1 |  |
| Irganox 1024 | 1 | 1 | 1 | 1 | 1 |  |
| Irganox 1035 | 1 | 1 | 1 | 1 | 1 |  |
| Tack | 0 | 0 | 0 | 0 | 0 | 0 |
| Odor | None | None | None | None | None | None |
| Viscosity Cps × 1000 | 4 | 3 | 2 | 2 | 1 | 1–15 |
| 180° Shear Lbs/inch | 21 | 24 | 25 | 28 | 26 | 15–40 |
| 90° Peel | .6 | .7 | .8 | .9 | 1.1 | .7–1.2 |
| % Loss in Tack (1st–5th reseal) | 20 | 0 | 9 | 12 | 8 | 15 or less |

Epolene C18 is a product of Eastman Chemical Company believed to consist of a maleic anhydride modified polyethylene polymer.

Escorez 5320 is a solid saturated hydrocarbon resin supplied by Exxon Chemical Company.

Tinuvin is a U.V. asborber.

Irganox 1035 is an antioxidant.

Irganox 1024 is a chelating agent.

The formulations set forth in Table I were coated as a continuous coating on a spunbonded polypropylene fabric at a coating weight of 1 oz./sq. yard. The coating could also be effected via gravure printing, silk screen printing or other well known methods described in the art.

As may be seen from Table I, the second through the fifth compositions, all possess adequate shear values, 90° peel and very little loss in tack from the first through the fifth reseal.

In accordance with a further embodiment of the present invention, a significant improvement in the system can be brought about by including in the formulation a thermoplastic rubber of the A-B-A or A-B block copolymer family, (disclosed in U.S. Pat. No. 3,676,202, which is incorporated herein by reference) especially those based on styrene-isoprene-styrene or styrene-butadiene-styrene. Fully saturated block polymers, also known as G polymers which are styrene-ethylene-butylene-styrene, can also be used. A typical workable formula is as follows:

| | Parts by weight |
|---|---|
| Epolene C18 | 100 |
| Kraton 1726 | 25 |
| Escorez 5320 | 75 |
| Tinuvin 328 | 1.3 |
| Irganox 1024 | 1.3 |
| Irganox 1035 | 1.3 |

The Kraton 1726 is styrene-ethylene-butylene-styrene block copolymer containing 30% styrene, and sold by the Shell Chemical Company.

Further, a list of typical working formulations containing a hot melt polymer, a modifying resin as well as a thermoplastic rubber are set forth in the following Table 2. It will be noted that all of the compositions possess good 180° shear, 90° peel and rolling ball tack percent change from the first to the fifth reseal.

TABLE 2

|  | 548 | 539 | 538 | 559 | 561 |
|---|---|---|---|---|---|
| Epolene C18 | 100 |  |  |  | 100 |
| Escorez 5320 | 30 | 50 | 200 |  | 40 |
| NA 601 |  | 80 |  |  |  |
| Kraton 1726 |  | 20 |  |  |  |
| UE 639 |  |  |  | 90 | 100 |
| Kraton 1102 |  |  | 10 |  |  |
| Crystalex 3100 |  |  |  | 200 |  |
| Tinuvin 328 | 1 | 1 | 1 | 1 | 1 |
| Irganox 1024 | 1 | 1 | 1 | 1 | 1 |
| Irganox 1035 | 1 | 1 | 1 | 1 | 1 |
| Viscosity × 1000 @ 350° F. | 2 | 7 | 12 | 7 | 1 |
| 180° shear | 28 | 23 | 25 | 23 | 26 |
| 90° peel | .9 | .8 | .9 | .8 | 1.1 |
| Rolling Ball Tack % change from 1st to 5th reseal | 12 | 0 | 15 | 0 | 7.9 |

NA 601 is a low molecular weight, low viscosity, polyethylene polymer supplied by USI.

UE 639 is a low viscosity ethylene vinyl acetate polymer.

Kraton 1102 is a thermoplastic elastomer styrene-butadiene-styrene A-B-A block copolymer sold by Shell Chemical Company. Crystalex 3100 is an α methyl styrene and styrene copolymer of molecular weight about 1,000, supplied by Hercules Chemical Company, this being a modifying resin.

The following are descriptions of certain of the tests carried out in accordance with the present invention:

Quickstick is measured by laying a length of tape, adhesive side up, upon a horizontal surface and then rolling a light hollow steel ball down an incline onto the adhesive. Quickstick is determined from the vertical height at which the ball starts and the distance the ball rolls along the tape before coming to rest.

The 180° Shear Test was carried out in accordance with PSTC (Pressure Sensitive Tape Council) Official Test Method No. 7 with the exception of the test surface used which was a nonwoven fabric. The 90° Peel Test was PSTC Test Method No. 1 with the exception that instead of 180° peel, the angle of peel was 90°.

I claim:

1. In a closure system for resealably attaching at least a portion of a pressure sensitive adhesive coated tape tab to a hot melt coated landing area of a fabric surface, and in which said pressure sensitive adhesive comprises (a) an elastomeric and thermoplastic block polymer of the structure A-B-A, wherein A is a thermoplastic polymer block of vinyl arene and possesses a glass transition temperation of above normal room temperature and B is an elastomeric polymer block of isoprene or copolymer therewith, the thermoplastic A blocks comprising about 10% to 30% by weight of the block polymer; and (b) about 75 to 150 parts by weight of a tackifier or mixture of tackifiers per 100 parts by weight of the total elastomers, the melting point range of said tackifier or mixture of tackifiers being from 85° C. to 130° C., the improvement in which said landing area is formed from a hot melt coating composition comprising: (A) a hot melt polymer selected from the group consisting of polyethylene, ethylene vinyl acetate, polyesters, polyamides and chemically modified polyethylenes; (B) between 10 and 50 parts by weight per 100 parts by weight of said hot melt polymer of a modifying resin having a number average molecular weight of between 500 and 3000, the viscosity of the mixture of said hot melt polymer together with said modifying resin being between 1,000 and 15,000 cps at 350° F.; and (C) between 0 and 40 parts by weight per 100 parts by weight of said hot melt polymer of a thermoplastic rubber of the A-B-A or A-B block copolymer family, with the proviso that when the amount of said thermoplastic rubber is greater than 0, then the amount of modifying resin may constitute up to 100 parts by weight per 100 parts by weight of said hot melt polymer, the 180° shear of said pressure sensitive adhesive with respect to said landing area being at least 15 lbs/inch; the 90° peel of said pressure sensitive adhesive with respect to said landing area being at least 0.7 lbs/inch and the light ball tack measurement value of said pressure sensitive adhesive does not change more than 15% when read after the first and 5th reseal of said closure system, whereby said closure system may be reopened and resealed numerous times while still permitting said tab to bond and hold tenaciously to said landing area of said fabric surface.

2. The closure system of claim 1 in which the A blocks in the thermoplastic and elastomeric block polymer comprising said pressure sensitive adhesive are derived from styrene, and there are at least 120 parts by weight of said tackifier per 100 parts by weight of the total elastomers in said pressure sensitive adhesive.

3. The closure system of claim 1 in which said hot melt polymer is selected from the group consisting of polyethylene, ethylene vinyl acetate, and chemically modified polyethylenes.

4. The closure system of claim 1 in which said thermoplastic rubber in said coating composition comprises a block polymer based on styrene-isoprene-styrene, styrene-ethylene-butylene-styrene, or styrene-butadiene-styrene.

5. The closure system of claim 1 in which said hot melt coating composition includes about 25 parts by weight per 100 parts by weight of said hot melt polymer of a styrene-ethylene-butylene-styrene copolymer containing about 30% styrene.

6. The closure system of claim 2 in which the mixture of said hot melt polymer together with said modifying resin has a viscosity of between 1,000 and 3,000 cps at 350° F.

7. The closure system of claim 1 in which the 180° shear of said pressure sensitive adhesive with respect to said landing area is between about 15 and about 25 lbs/inch and the 90° peel of said pressure sensitive adhesive with respect to said landing area being between 0.8 and 1.2 lbs/inch.

8. A disposable diaper having a fabric covered backing and being provided with the closure system of claim 1.

9. An incontinent device having a fabric covered backing and being provided with the closure system of claim 2.

10. The closure system of claim 1 in which said fabric is woven or non-woven.

* * * * *